United States Patent
Choi et al.

(10) Patent No.: US 9,893,344 B2
(45) Date of Patent: Feb. 13, 2018

(54) SAFETY DEVICE FOR PREVENTING OVERCHARGING OF BATTERY

(71) Applicant: Hyundai Motor Company, Seoul (KR)

(72) Inventors: Jun Seok Choi, Gyeonggi-Do (KR); Hae Kyu Lim, Gyeonggi-Do (KR); Yoon Cheol Jeon, Gyeonggi-Do (KR); Jeong Hun Seo, Gyeonggi-Do (KR); Yong Jin Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 364 days.

(21) Appl. No.: 14/471,432

(22) Filed: Aug. 28, 2014

(65) Prior Publication Data
US 2015/0180016 A1 Jun. 25, 2015

(30) Foreign Application Priority Data
Dec. 24, 2013 (KR) .................. 10-2013-0162225

(51) Int. Cl.
*H01M 2/34* (2006.01)
*H01M 10/42* (2006.01)

(52) U.S. Cl.
CPC ......... *H01M 2/345* (2013.01); *H01M 10/425* (2013.01); *H01M 2200/20* (2013.01); *H01M 2220/20* (2013.01)

(58) Field of Classification Search
CPC ...... H01M 10/425; H01M 2/345; H01M 2/34; H01M 2/10; H01M 10/0565
See application file for complete search history.

(56) References Cited

U.S. PATENT DOCUMENTS

| | | | | |
|---|---|---|---|---|
| 2004/0247994 | A1* | 12/2004 | Masuda | H01M 2/345 429/66 |
| 2007/0054157 | A1* | 3/2007 | Ryu | H01M 10/42 429/7 |
| 2010/0247980 | A1* | 9/2010 | Jang | H01M 2/34 429/10 |
| 2012/0052359 | A1* | 3/2012 | Yoshitake | H01M 2/1077 429/120 |

(Continued)

FOREIGN PATENT DOCUMENTS

| | | |
|---|---|---|
| JP | 2009-142140 A | 6/2009 |
| JP | 2013-012374 A | 1/2013 |
| KR | 10-2009-0047240 A | 5/2009 |

(Continued)

*Primary Examiner* — Kenneth J Douyette
(74) *Attorney, Agent, or Firm* — Mintz Levin Cohn Ferris Glovsky and Popeo, P.C.; Peter F. Corless

(57) ABSTRACT

A safety device for preventing overcharging of a battery includes: a battery stack including a plurality of cells; a safety circuit connected to two or more cells and provided with an electrical conduction control unit that controls electrical conduction; and a closed circuit disposed between the cells connected to the safety circuit and provided with a switching unit which is switched on or off upon cell swelling, such that when cell swelling occurs, the switching unit is switched on by a pressing force, disabling the electrical conduction control unit of the safety circuit so electrical conduction between the cells is established via the switching unit, and when cell swelling occurs again, the switching unit is switched off, cutting off the electrical conduction between the cells.

5 Claims, 4 Drawing Sheets

(56) References Cited

U.S. PATENT DOCUMENTS

2014/0186667 A1* 7/2014 Lee ................. H01M 2/345
429/61

FOREIGN PATENT DOCUMENTS

| KR | 10-2009-0063839 | | 6/2009 | |
|----|-----------------|---|--------|---|
| KR | 10-2011-0093358 | A | 8/2011 | |
| KR | 10-2013-0043258 | A | 4/2013 | |
| KR | 10-2013-0061018 | | 6/2013 | |
| WO | WO-2009/057893 | A1 * | 5/2009 | ............. H01M 2/10 |

* cited by examiner

SAFETY DEVICE FOR PREVENTING OVERCHARGING OF BATTERY

CROSS-REFERENCE(S) TO RELATED APPLICATION

The present application claims under 35 U.S.C. §119(a) the benefit of Korean Patent Application Number 10-2013-0162225 filed on Dec. 24, 2013, which is incorporated by reference herein in its entirety.

BACKGROUND (a) Field of the Invention

The present invention relates to a safety device for preventing overcharging of a battery, in particular, to a safety device which can prevent safety accidents attributable to overcharging of a battery by interrupting supply of electricity to a battery stack.

(b) Description of the Related Art

Recently, in order to prevent environmental pollution caused by use of fossil fuels, environmentally-friendly vehicles which run on electricity, such as a hybrid vehicle, are in greater demand.

An environmentally-friendly vehicle typically uses a battery which stores electric energy. The battery needs to have a high storage capacity so that the vehicle can run on electricity. Accordingly, medium or high capacity batteries are used for environmentally-friendly vehicles.

However, it is difficult to install a medium or high capacity battery in a vehicle because medium or high capacity batteries often are large and heavy. For this reason, miniaturization of the batteries is needed. Recently, a battery structure using a pouch which can meet such a demand has attracted attention. The battery structure using the pouch has high electric efficiency but low stability. For this reason, a technology which can ensure safety is needed.

When the battery using such a battery pack is overcharged, the battery undergoes overheating, a voltage rise, and swelling in which the battery is inflated due to gas generated. Accordingly, a high voltage battery system needs to be equipped with a safety device for prevention of overcharging. When overcharging occurs, a safety device for preventing overcharging intercepts a current in order to prevent thermal runaway, thereby preventing explosion of a battery system.

A passive-type safety device for preventing overcharging according to a conventional art uses an inflation pressure which is generated at the time of cell swelling. When the cell swelling sufficiently progresses, a cell inflates through an opening formed in an end plate, and finally a cell tap is fractured. Through this process, electric current is intercepted and safety is secured.

In order for this mechanism to operate, the cell swelling needs to sufficiently progress before thermal runaway occurs. When the cell swelling does not reach a sufficient level before the thermal runaway occurs, even though this mechanism starts operating at the same time as the occurrence of thermal runaway, explosion of a battery may occur due to thermal runaway. When the amount of gas generated is not sufficient, the cell tap may not be fractured.

As an alternative method of preventing overcharging of a battery, there is an active-type method which actively cuts off a relay.

The active-type safety structure for preventing overcharging is equipped with a sensor for detecting inflation of a cell or a switch, and intercepts current supplied to a battery system by interrupting supply of power to a relay when cell inflation is detected.

However, a technology which interrupts supply of power to the relay cannot block the flow of current when the relay is short-circuited. In an emergency such as an accident, the active-type overcharging-preventing safety structure is difficult to secure safety when electrical/electronic components are out of order, for example, when a sensor or a switch malfunctions.

In general, a passive-type overcharging-preventing safety structure is more reliable than an active-type overcharging-preventing safety structure, so there is a demand for improvement in technology of the passive-type system.

The foregoing is intended merely to aid in the understanding of the background of the present invention, and is not intended to mean that the present invention falls within the purview of the related art that is already known to those skilled in the art.

SUMMARY

Accordingly, the present invention is directed to a safety device for preventing overcharging of a battery, where the safety device can accurately detect inflation of a cell even from a trace amount of gas generated when cell swelling attributable to overcharging of a battery occurs and secure safety of the battery by disconnecting a charging circuit upon detection of the inflation of the cell.

According to one aspect, a safety device for preventing overcharging of a battery includes: a battery stack including a plurality of cells; a safety circuit connected to two or more cells among the cells in the battery stack and provided with an electrical conduction control unit which is enabled or disabled to control electrical conduction; and a closed circuit disposed between the cells connected to the safety circuit and having a switching unit which is switched on or off upon cell swelling, wherein, when the cell swelling occurs, the switching unit is switched on by a pressing force, disabling the electrical conduction control unit of the safety circuit so electrical conduction between the cells is established via the switching unit, and when the cell swelling occurs again, the switching unit is switched off, cutting off the electrical conduction between the cells.

The switching unit may be disposed between the cells connected to the safety circuit and include a first switch adjacent to a side surface of a first cell among the connected cells and a second switch adjacent to a side surface of a second cell among the connected cells, the second switch facing the first switch.

The switching unit may be structured such that the first switch extends toward the second cell from the side surface of the first cell, the second switch extends so as to correspond to the first switch, and the second switch is inserted into the first switch while the first and second switch laterally move toward each other.

A distal end of the first switch may be provided with a first switching terminal, a middle portion of the second switch may be provided with a second switching terminal, and the first switching terminal and the second switching terminal may come into contact with each other, making an electrical connection therebetween when the cell swelling occurs and when the first and second switches laterally move toward each other.

The switching unit may be structured such that an end portion of the second switch remains inserted in the first switch in normal conditions in which there is no cell swelling.

The battery stack may have an installation space between the cells to which the closed circuit is connected, and the switching unit is disposed in a center portion of the installation space.

The electrical conduction control unit provided for the safety circuit may be a fuse.

The safety circuit and the closed circuit may be electrically connected to the same cells, two or more cells and the electrical conduction control unit may be connected in series with each other for the safety circuit, and the safety circuit and the switching unit may be connected in parallel for the closed circuit.

The safety device for preventing overcharging of a battery according to one embodiment of the present invention can accurately detect inflation of a cell even from a trace amount of gas generated when cell swelling occurs attributable to the overcharging of the battery, and secures safety of the battery by disconnecting a charging circuit.

A conventional battery overcharging-preventing device has a packaging space, which allows cells to inflate, at the back of the cells. For this reason, the conventional device has a large volume. On the other hand, the safety device according to one embodiment of the invention can be embodied in a compact module, without requiring the packaging space.

For this reason, the safety device according to one embodiment of the present invention can increase energy density per unit volume of a battery system, thereby improving marketability of a vehicle which employs the safety device of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the tem "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A safety device for preventing overcharging of a battery according to a preferred embodiment of the present invention will be described with reference to the accompanying drawings.

Figure 1:
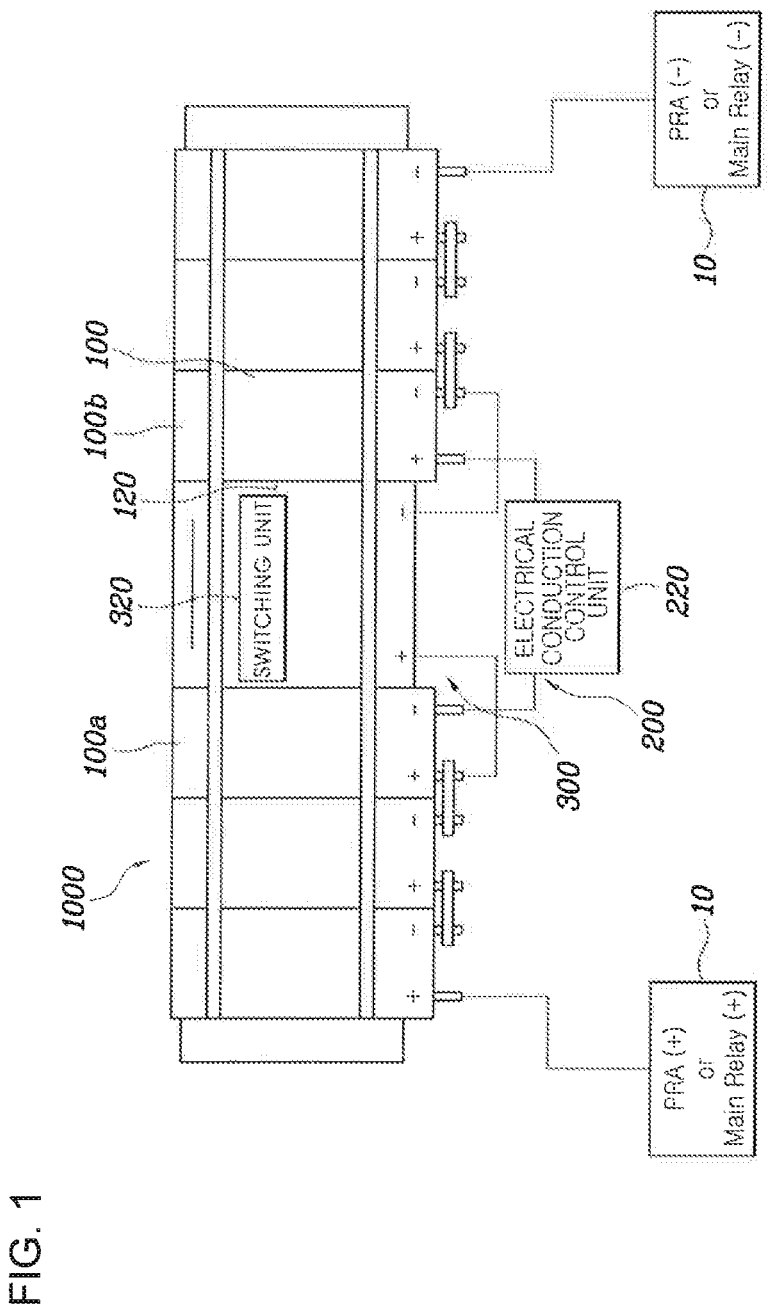
FIG. 1 is a schematic view illustrating a safety device for preventing overcharging of a battery according to one embodiment of the present invention.
Figure 2:
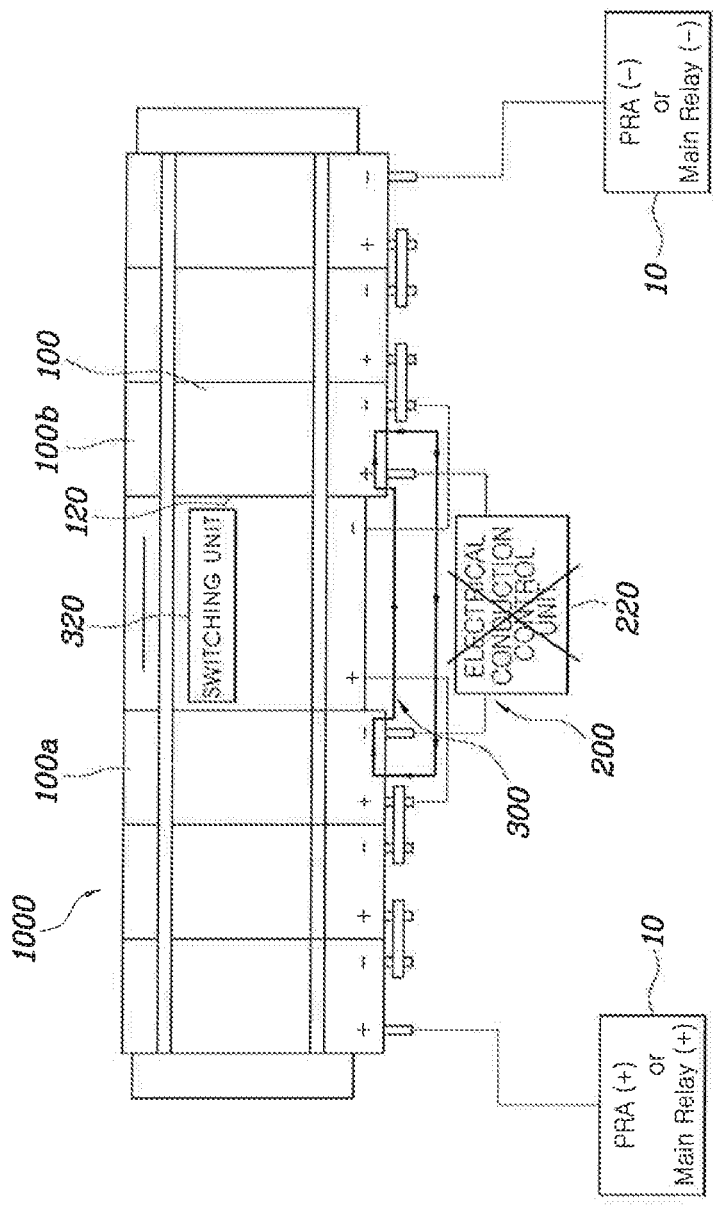
FIG. 2 is a schematic view illustrating an operation state of the safety device for preventing overcharging of the battery illustrated in FIG. 1.
Figure 3:
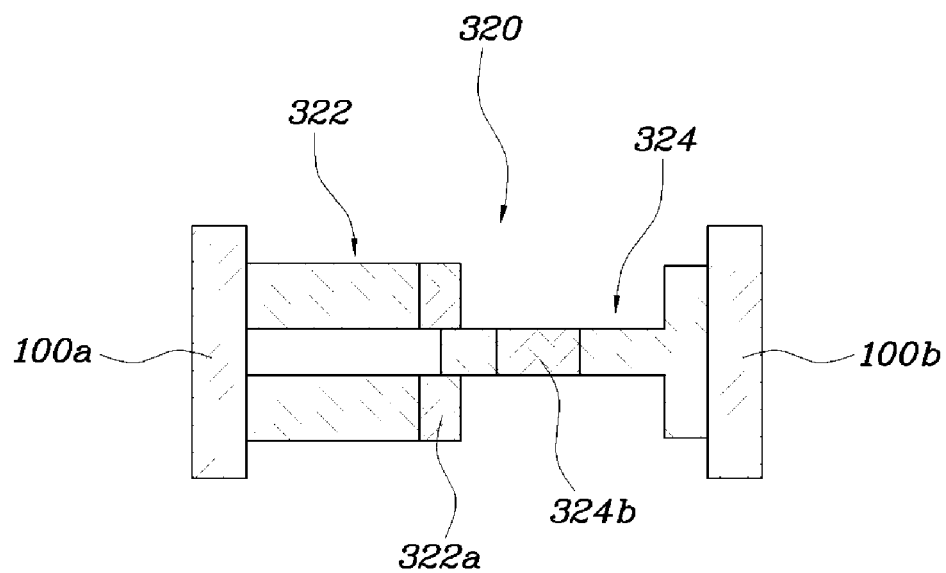
FIGS. 3 to 5 are views illustrating a switching unit of the safety device for preventing overcharging of the battery illustrated in FIG. 1.
Figure 4:
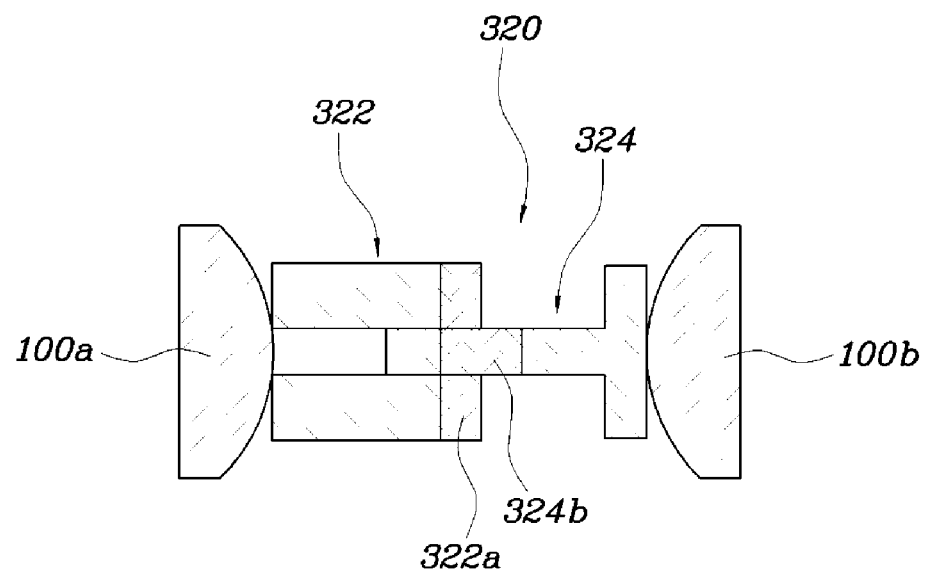
Figure 5:
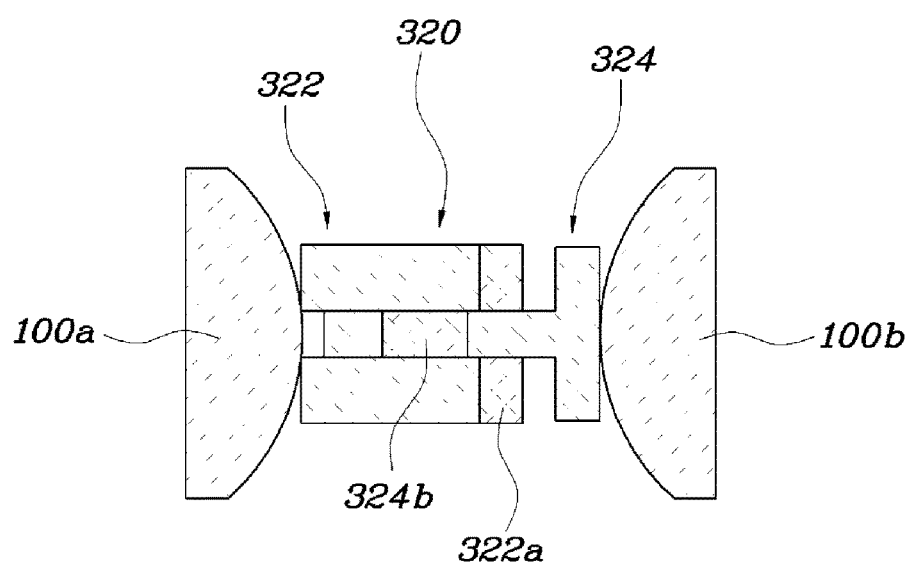

FIG. 1 is a schematic view illustrating a safety device for preventing overcharging of a battery according to one embodiment of the present invention; FIG. 2 is a schematic view illustrating an operation state of the safety device for preventing overcharging of the battery illustrated in FIG. 1; and FIGS. 3 to 5 are views illustrating a switching unit of the safety device for preventing overcharging of the battery illustrated in FIG. 1.

With reference to FIGS. 1 to 5, a safety device for preventing overcharging of a battery according to one embodiment of the present invention includes a battery stack 1000 made up of a plurality of cells, a safety circuit 200 connected to two or more cells among the plurality of cells in the battery cell stack 1000 and provided with an electrical conduction control unit 220 which is enabled or disabled to control electrical conduction, and a closed circuit 300 disposed between the cells connected to the safety circuit 200 and provided with a switching unit 320 which is switched on or off when cell swelling occurs.

The safety circuit 200 and the closed circuit 300 are electrically connected to the same cells 100. For the safety cell 200, two or more cells and the electrical conduction control unit 220 are connected in series. For the closed circuit 300, the safety circuit 200 and the switching unit 320 are connected in parallel.

As illustrated in FIGS. 1 and 2, the battery stack 1000 includes the multiple cells 100 stacked on each other, and the cells 100 are connected in series with each other. The battery stack 1000 is charged by means of a Power Relay Assembly (PRA) 10. In the battery stack 1000, two or more cells among the cells 100 are connected to the safety circuit 200.

To sum up, the multiple cells 100 are connected in series with each other, and two or more cells among the multiple cells 100 are electrically connected in series with each other via the safety circuit 200 so that electrical conduction between the connected cells 100 is established via the safety circuit 200. The safety circuit 200 includes the electrical conduction control unit 220 which is enabled or disabled to control electrical conduction. The electrical conduction control unit 220 intercepts current supplied to the safety circuit 200 when current flows to the closed circuit 300.

The electrical conduction control unit 220 provided for the safety circuit 200 may be a fuse which is fused off at an appropriate voltage which varies depending on the specification of the battery.

The cells 100 connected to the safety circuit 200 are connected are also connected to the closed circuit 300. The safety circuit 200 and the switching unit 320 of the closed circuit 300 are connected in parallel. The closed circuit 300 is provided with the switching unit 320 which is switched on or off by physical force attributable to inflation pressure of the cells 100 when cell swelling occurs.

When cell swelling occurs due to overcharging of the cells 100, the cells 100 inflate to press the switching unit 320 so that the switching unit 320 is switched on. When the switching unit 320 is switched on, current flows to the closed circuit 300.

The electrical conduction control unit 220 is disabled by the current flowing to the closed circuit 300. As a result, the electrical conduction to the safety circuit 200 is cancelled and the electrical conduction between the cells 100 is established via the switching unit 320 of the closed circuit 300.

When cell swelling occurs again in this state, the switching unit 320 is switched off to cut off the electrical conduction between the cells 100 and the closed circuit 300. In particular, the electrical conduction between the cells 100 is cut off and current to the battery stack 1000 is intercepted.

The switching unit 320 which selectively allows electrical connection to the safety circuit 200 or the closed circuit 300 when cell swelling occurs is described in greater detail below.

As illustrated in FIG. 3, the battery stack 1000 is provided with an installation space 120 provided between the cells 100 to which the closed circuit 300 is connected. The switching unit 320 may be disposed in a center portion of the installation space 120. The switching unit 320 may be fixedly installed between two cells 100 when one of the two cells 100 will be referred to as a first cell 100a and the other cell will be referred to as a second cell 100b. Alternatively, the switching unit 320 may be embodied in a discrete device which is switched on or off by inflation pressure of the cells 100.

Since the switching unit 320 is disposed between the cells 100, i.e., between the first cell 100a and the second cell 100b, the switching unit 320 smoothly operates by the inflation pressure attributable to swelling of the cells 100. When the switching unit 320 is installed in the center of the installation space 120 provided between the cells 100, it can accurately respond to inflation of the cells and promptly operates in response to the inflation of the cells.

The switching unit 320 installed in the installation space 120 of the battery stack 1000 is disposed between the first cell 100a and the second cell 100b connected to the safety circuit 100, and includes a first switch 322 adjacent to a side surface of the first cell 100a and a second switch 324 adjacent to a side surface of the second cell 100b. The second switch 324 is disposed to face the first switch 322.

The switching unit 320 is disposed between the first cell 100a and the second cell 100b and pressed by the first cell 100a and/or the second cell 100b when cell swelling occurs. Since the first switch 322 is disposed in the vicinity of the side surface of the first cell 100a and the second switch 324 is disposed in the vicinity of the side surface of the second cell 100b and faces the first switch 322, the first switch 322 and the second switch 324 come into contact with each other at the time of cell swelling so that they are electrically connected to each other.

The switching unit 320 is structured such that the first switch 322 extends toward the second cell 100b from the side surface of the first cell 100a, the second switch 324 extends toward the first switch 322 from the side surface of the second cell 100b, and the second switch 324 is inserted into the first switch 322 while the first switch 322 and the second switch 324 laterally move toward each other.

In this way, as the first switch 322 and the second switch 324 extend toward each other and laterally move toward each other so that the second switch 324 is inserted into the first switch 322 at the time of cell swelling, even though the cells 100a and 100b swell by different volumes at the time of the cell swelling, since the second switch 324 is inserted into the first switch 322, it is possible to prevent the switches from being shifted to one side.

For example, the first switch 322 may have a cylindrical shape and the second switch 324 may have a rod shape so that the second switch 324 can be easily inserted into the first switch 322 while laterally moving. In this way, the first switch 322 and the second switch 324 easily come into contact with each other at the time of cell swelling, thereby smoothly cutting off electrical conduction in the battery stack 1000.

A distal end of the first switch 322 which is nearer the second cell 100b than the first cell 100a is provided with a first switching terminal 322a and a middle portion of the second switch 324 is provided with a second switching terminal 324b. When cell swelling occurs, the first switch 322 and the second switch 324 laterally move in opposite directions to approach each other so that the first switching terminal 322a and the second switching terminal 324 come into contact with each other and are electrically connected to each other.

In one embodiment of the present invention, upon cell swelling, the switching unit 320 is pressed due to inflation of the cells so that the switching unit 320 can be switched on. At this time, the electrical conduction control unit 220 of the safety circuit 200 is disabled so that electrical conduction between the cells is established via the switching unit 320. When cell swelling occurs again, the switching unit 320 becomes switched off so that electrical conduction between the cells 100 is cut off.

To this end, the switching unit 320 includes the first switch 322 adjacent to the first cell 100a and the second switch 324 adjacent to the second cell 100b, and the first switch 322 and the second switch 324 are provided with the first switching terminal 322a and the second switching terminal 324b, respectively, so that the first switching terminal 322a and the second switching terminal 324b can come into electrical contact with each other.

The first switching terminal 322a is disposed at the distal end of the first switch 322, and the second switching terminal 324 is disposed at the middle portion of the second switch 324.

Specifically, as illustrated in FIG. 3, normally the first switch 322 and the second switch 324 are disposed to face each other before cell swelling occurs, and the first switching terminal 322a and the second switching terminal 324b are not in electrical contact with each other in normal conditions.

Under normal conditions, the electrical conduction between the cells 100 is established via the electrical conduction control unit 220 of the safety circuit 200 and the switching unit 230 maintains an OPP state where electrical conduction is not established via the switching unit 230.

When swelling of the cell 100 occurs, as illustrated in FIG. 4, the first switch 322 and the second switch 324 move toward each other due to inflation of the cell 100 so that the first switching terminal 322a provided at an end portion of the first switch 322 can be electrically connected to the second switching terminal 324b disposed in the middle portion of the second switch 324.

As the first switching terminal 322a and the second switching terminal 324b come into contact with each other, the switching unit 320 is switched on. As the switching unit 320 is switched on, current flows to the closed circuit 300.

At this time, the electrical conduction control unit 220 of the safety circuit is disabled so that current may not flow to the safety circuit 200, and electrical conduction between the cells 100 may be established via the closed circuit 300 by the action of the switching unit 320.

When cell swelling occurs again in a state when the electrical conduction between the cells 100 is established via the closed circuit 300, as illustrated in FIG. 5, the second switch 324 is completely inserted into the first switch 322 so that the first switching terminal 322*a* and the second switching terminal 324*b* are separated from each other.

In this case, the switching unit 320 is switched off so that current cannot flow to the closed circuit 300 and the electrical conduction between the cells 100 is cut off. In particular, current does not flow in the battery stack 1000.

If the cell swelling does not progress further from this state and the inflation pressure of the cells diminishes, the first switch 322 and the second switch 324 are separated again so that the first switching terminal 322*a* and the second switching terminal 324*b* can come into contact with each other again. However, generally a Battery Management System (BMS) which controls a fuel cell stack interrupts supply of electricity to a battery stack when the current flow is cut off in the battery stack. Accordingly, even though the first switching terminal 322*a* and the second switching terminal 324*b* come into contact with each other again, additional cell swelling is prevented by the control of the BMS.

The switching unit 320 may be structured such that an end of the second switch 324 stays inserted in the first switch 322 in normal conditions where the cell swelling does not occur.

If the state when the end of the second switch 324 is inserted in the first switch 322 is not maintained, the first switch 322 and the second switch 324 stand face to face with each other at their ends or are separated from each other at the time of cell swelling so that electrical connection between them cannot be made.

As the state where the end of the second switch 324 is inserted in the first switch 322 is maintained all the time in normal conditions, the first switch 322 and the second switch 324 laterally move toward each other at the time of cell swelling, they can be smoothly, electrically connected.

The safety device for preventing overcharging of a battery according to one embodiment of the present invention described above can accurately detect inflation of a cell even from a trace amount of gas generated when cell swelling occurs due to overcharging of the battery, and secure safety of the battery by disconnecting a charging circuit.

In addition, unlike conventional battery overcharging-preventing devices which need to have a packaging space which allows a cell of the battery to inflate, thereby having a large volume, the safety device according to one embodiment of the present invention can be embodied in a compact size, without requiring such a packaging space.

Therefore, the safety device according to one embodiment of the present invention can increase energy density per unit volume of a battery system, enhancing marketability of a vehicle which employs the safety device.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A safety device for preventing overcharging of a battery, the safety device comprising:
a battery stack including a plurality of cells;
a safety circuit connected to two or more cells among the cells in the battery stack and provided with an electrical conduction control unit which is enabled or disabled to control electrical conduction; and
a closed circuit disposed between the cells connected to the safety circuit, the closed circuit including a switching unit which is switched on or off upon cell swelling,
wherein, when the cell swelling occurs, the switching unit is switched on by a pressing force, disabling the electrical conduction control unit of the safety circuit so electrical conduction between the cells is established via the switching unit, and when cell swelling occurs again, the switching unit is switched off, cutting off the electrical conduction between the cells,
the switching unit is disposed between the cells connected to the safety circuit and includes a first switch adjacent to and in direct contact with a side surface of a first cell among the connected cells and a second switch adjacent to and in direct contact with a side surface of a second cell among the connected cells, the second switch facing the first switch,
the switching unit is structured such that the first switch extends toward the second cell from the side surface of the first cell, the second switch extends so as to correspond to the first switch, and the second switch is inserted into the first switch while the first and second switch laterally move toward each other, and
the switching unit is structured such that an end portion of the second switch remains inserted in the first switch in a normal state in which there is no cell swelling, such that in the normal state, the first and second switches remain in contact with the side surfaces of the first and second cells, respectively.

2. The safety device according to claim 1, wherein a distal end of the first switch is provided with a first switching terminal, a middle portion of the second switch is provided with a second switching terminal, and the first switching terminal and the second switching terminal come into contact with each other, making an electrical connection therebetween when cell swelling occurs and when the first and second switches laterally move toward each other.

3. The safety device according to claim 1, wherein the battery stack has an installation space between the cells to which the closed circuit is connected, and the switching unit is disposed in a center portion of the installation space.

4. The safety device according to claim 1, wherein the electrical conduction control unit provided for the safety circuit is a fuse.

5. The safety device according to claim 1, wherein the safety circuit and the closed circuit are electrically connected to same cells, two or more cells and the electrical conduction control unit are connected in series with each other for the safety circuit, and the safety circuit and the switching unit are connected in parallel for the closed circuit.

* * * * *